Sept. 25, 1962 W. J. OESTREICHER 3,056,093
BEAM TUBE OSCILLATOR WITH FEEDBACK CIRCUIT BETWEEN
THE OUTPUT AND DEFLECTING ELECTRODES
Filed May 12, 1958 2 Sheets-Sheet 1

INVENTOR.
WARREN J. OESTREICHER
BY [signature]
ATTORNEY

INVENTOR.
WARREN J. OESTREICHER
BY Theodore Halpern
ATTORNEY 3,056,093
Patented Sept. 25, 1962

3,056,093

BEAM TUBE OSCILLATOR WITH FEEDBACK CIRCUIT BETWEEN THE OUTPUT AND DEFLECTING ELECTRODES

Warren J. Oestreicher, 160–68 22nd Ave., Whitestone, N.Y.

Filed May 12, 1958, Ser. No. 734,627
2 Claims. (Cl. 331—80)

This invention relates to oscillators and more specifically to modulated oscillators used as demodulators for color television.

This application is a continuation in part of the following copending applications: Ser. No. 495,953, now Patent No. 2,922,073, Color Reproduction Systems of The Cathode Ray Tube Type; Ser. No. 498,710, now Patent No. 2,938,142, Control of Color Television of The Cathode Ray Tube Type; Ser. No. 511,660, now Patent No. 2,863,079, Masking Devices for Color Television and the Like.

One of the objects of this invention is an oscillator circuit in which the feed back necessary to sustain oscillation is applied from the output of the device to cause deflection of the electron beam.

Another object of the invention is to provide feedback extending from the output to deflecting means of an oscillator tube through an appropriate network so connected as to switch the electron beam within the tube between several electrodes connected to the load or output circuit.

A further object of the invention is to provide within the oscillator tube a beam intensity modulating electrode or grid which can independently control the intensity of the electron beam and thus provide amplitude modulation of the output signal independent of the feedback means.

Another and more specific embodiment of the invention includes a piezo-electric crystal element coupled to the load or deflection electrodes or included in the feed back circuit in such a way as to stabilize the frequency of the oscillator.

Another embodiment of the invention provides a signal source of specific frequency modulated in amplitude and phase to the intensity control grid of the oscillator tube while said oscillator tube 27 is oscillating at a specific frequency controlled as to frequency and phase, thus permitting use as a synchronous demodulator.

A further embodiment of the invention provides for the evolution of a source of error on compensating voltage from the output circuit of the synchronous demodulator indicating average phase and frequency difference of the intensity control grid signal and the oscillator signal. This error voltage may be used to control the frequency and phase of the synchronous demodulator-oscillator in order to effect synchronism.

These and other objects of the invention will be more fully understood from the drawings enclosed herewith.

FIG. 1 in the form of a circuit diagram represents a modulated oscillator embodying certain features of the invention.

FIGS. 6 and 7 represent the invention as applied to three color television reception.

Figure 1:
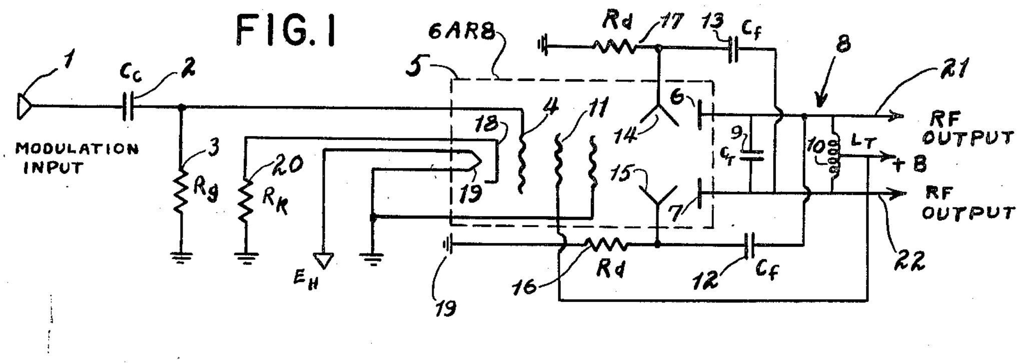

In FIG. 1 a modulating input for example in the form of standard color television signals is applied at terminal 1 and fed over coupling condenser 2 and grid leak resistor 3 to the first or control grid 4 of a sheet beam tube 5 of otherwise well known construction such as type 6AR8.

Tube 5 has a pair of output electrodes 6, 7 connected to a frequency control circuit 8 including tank capacitance 9 and tank inductance 10.

Tank inductance 10 is center-tapped and connected to B+ of, say, a 100 to 300 volt anode suply source, and also connected to a second or accelerating grid 11 of sheet beam tube 5.

At the same time, output electrodes or anodes 6, 7 are coupled over feedback capacitances 12, 13 to deflecting plates 14, 15 of sheet beam tube 5. Deflecting plates 14, 15 are also connected over ground return resistors 16, 17 to ground.

Cathode 18 of sheet beam tube 5 is heated by filament 19 and is also connected over cathode bias resistor 20 to ground, or to any other appropriate point of predetermined potential.

Modulated radio frequency output containing different chrominence signals corresponding to say two complementary colors is derived from lines 21, 22 to be applied or utilized in otherwise well known manner, directly or indirectly, at the deflection or other control electrodes of a television cathode ray receiving tube, or in the manner disclosed in one of the above mentioned copending patent applications.

Typical values for the feedback capacitance in color television reception has been found to lie between .001 to 0.5 mmf.

Typical values for a feedback capacity for a 5 mc. oscillator with audio modulation have been found to be as follows:

$Cc$=.01 μf.
$Ct$=100 μμf.
$Lt$=10 μh.
$Cf$=22 μμf.
$Rd$=100 KΩ.
$Rk$=390 Ω
$Rg$=1 MΩ

Such an oscillator circuit will be explained on hand of FIG. 2.

Figures 2, 3:
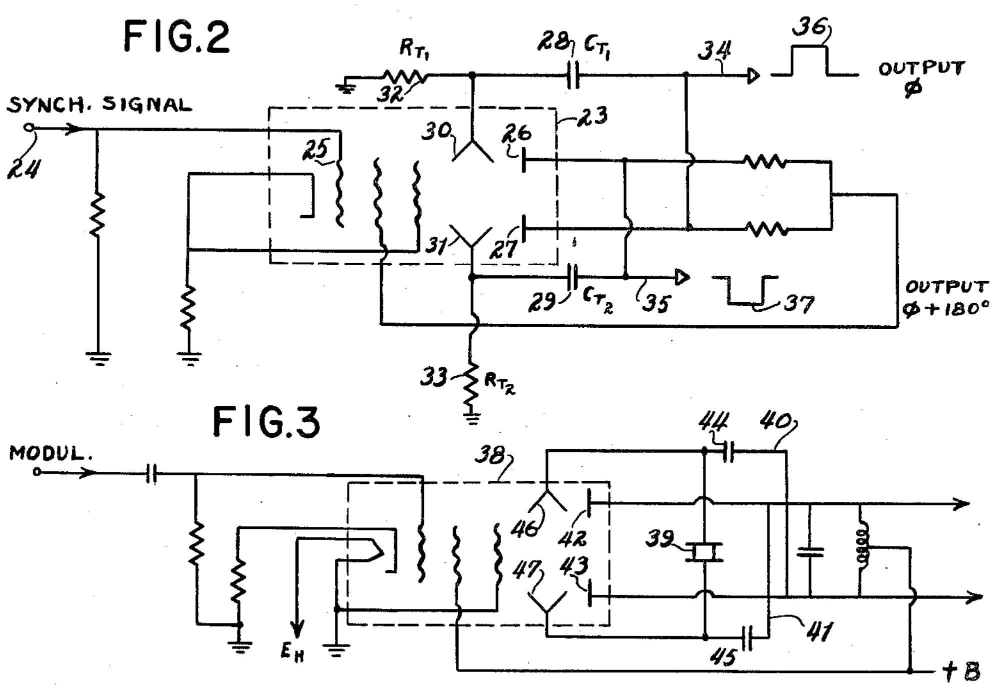
FIG. 2 represents the invention as applied to a multi-vibrator.
FIG. 3 represents a modification of FIG. 1 and FIG. 4 a modification of FIG. 3.

In FIG. 2 a sheet beam tube of the type illustrated in FIG. 1 at 5 is indicated at 23, with synchronization signals being applied at 24 to control grid 25 to determine the frequency of the oscillator.

Feedback circuits are shown to extend from anodes 26, 27 over feedback capacities 28, 29 to deflection electrodes 30, 31 of tube 23. Deflection electrodes 30, 31 in turn are also connected to appropriately dimensioned ground return resistors 32, 33 or in any other suitable manner without departing from the scope of this disclosure.

Output electrodes or anodes 26, 27, over lines 34, 35, also supply output pulses in 180 degrees phase displacement.

If the time constants determined by capacity-resistor circuits 28, 32 and 27, 33, respectively, are equal, square waves of opposite phase relation result as schematically indicated in FIG. 2 at 36, 37.

In other words the circuit is adapted to operate as a multi-vibrator.

In FIGS. 1 and 2 feedback extending from the anodes or output electrodes over the capacity couplings to the deflection electrodes, causes the beam current of the sheet beam tube to be switched alternatingly between anodes.

The beam current on the other hand is controlled by a separate control grid, substantially independently of this switching function.

The circuit of FIG. 3 represents a modification of the circuit of FIG. 1.

The modulated oscillator tube 38 is controlled by a quartz element schematically indicated at 39 while feedback lines 40, 41 extend from output electrodes, 42, 43 over feedback coupling capacitors 44, 45 to deflecting electrodes 46, 47.

Figure 4:
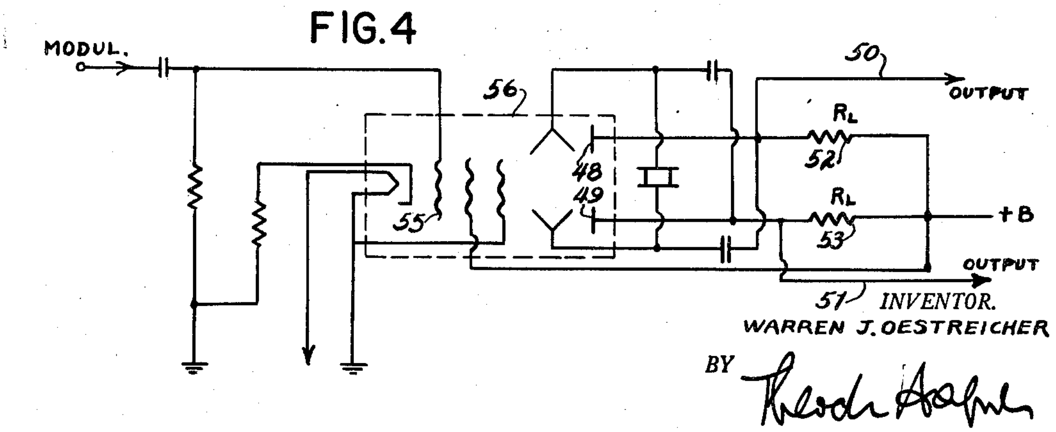

FIG. 4 represents a modification of FIG. 3 where output electrodes 48, 49 in addition to being connected to output lines 50, 51, are interconnected over load impedances or resistors 52, 53, also connected to B+. Otherwise the circuit of FIG. 4 substantially resembles that of FIG. 3.

Figures 5, 6, 8:
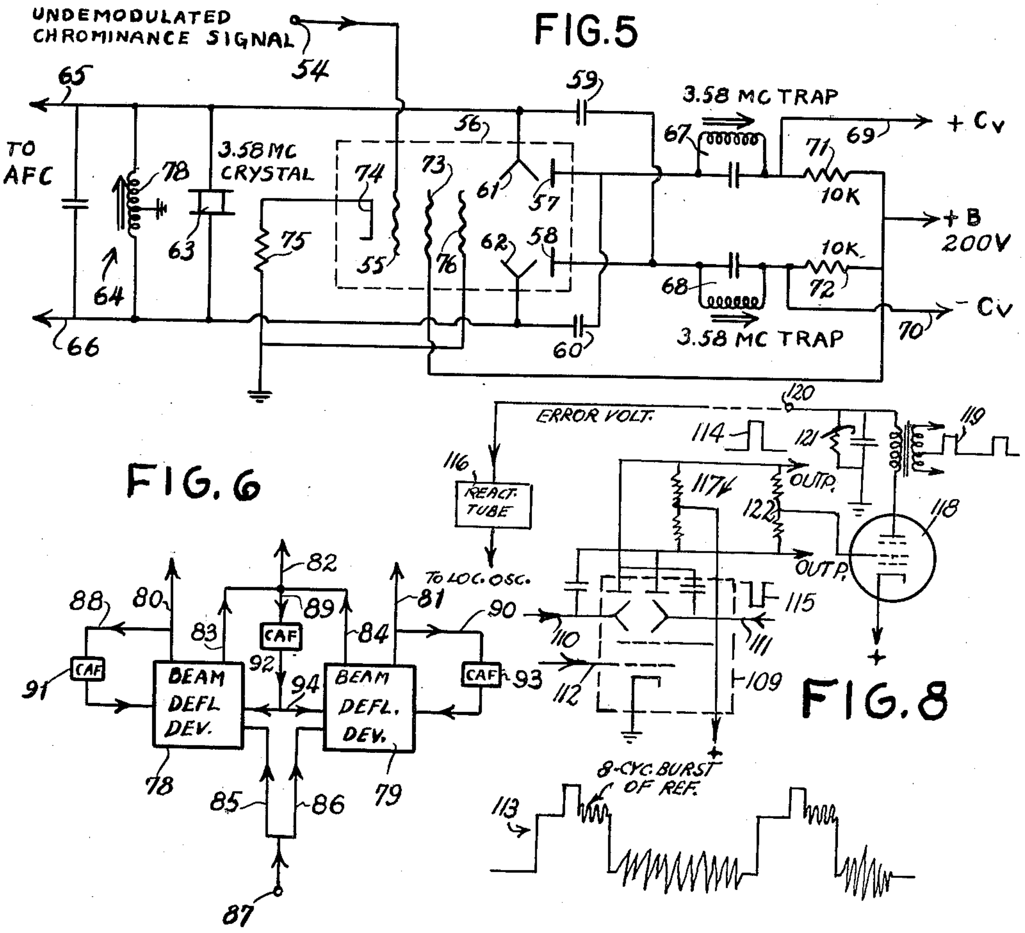
FIGS. 5 and 6 represent other embodiments of the invention also in the form of circuit diagrams.
FIG. 8 represents a modification of the invention including an improved frequency stage control.

In FIG. 5 self-oscillating synchronous demodulation is described for color television reception as applied to a two color or chrominance translation system and substantially independent from intensity translation.

The invention, of course, may be applied to the independent translation of three and more chrominance informations without departing from the scope of this invention as will be explained further below.

In the circuit of FIG. 5 the undemodulated composite chorminance signal is applied at 54 to control grid 55 of a beam deflection tube 56 of the type mentioned before in connection with FIGS. 1 to 4, or of any other suitable type, without departing from the scope of this invention.

In accordance with this invention, however, feedback circuits are shown to extend from anodes 57, 58 over coupling condensers 59, 60 to deflection plates or electrodes 61, 62, respectively, which are also connected to a 3.58 mc. frequency determining crystal device 63 and a 3.58 mc. oscillator circuit 64, and over lines 65, 66 to automatic phase and fequency control devices otherwise well known per se, in the art of television receiver circuitry.

Anodes or output electrodes 57, 58, on the other hand, are connected over filters 67, 68 forming 3.58 mc. frequency traps to lines 69, 70 feeding the different chrominance video signals separately to appropriate points or terminals of a television receiver circuit or a television receiver tube as is well known in the art, or as disclosed in the above mentioned copending applications.

At the same time filters 67, 68 are inter-connected over 10 kilo-ohm resistors 71, 72 and also connected to B+ which preferably is also coupled to accelerating electrode 73 while cathode 74 of beam deflection tube 56 is connected over a 390 ohm bias resistor 75 to ground.

In this circuit the self-oscillating feature by virtue of feedback from the anodes to deflection electrodes 61, 62 switches the beam current alternately between the two anodes 57, 58. The incoming chrominance signal of 3.58 mc. frequency is applied to control grid 55 and modulates the current in the electron beam prior to switching. The amplifying function is performed by the first part of the tube including oscillator or screen grid 73 and is therefore independent of the switching or demodulation function.

The demodulated signals appear across load resistors 71, 72 in the anode circuits. The carrier, or reference signal is isolated from the video load resistor by the 3.58 mc. traps 67, 68 which also serve to isolate the oscillator circuits from variations in capacitance and loading of subsequent chrominance circuits. Precise control of the reference frequency is obtained by otherwise well known automatic frequency and phase control circuits.

This system has among others, the following advantages:

Reference oscillator and demodulator are combined in a single tube.

It permits large amplification in demodulator circuits.

The result is a high level output sufficient directly to drive a kinescope.

Positive and negative polarity signals are provided simultaneously.

The system can be used without crystal control and crystal 63 omitted if desired.

Feedback capacitors 59, 60 may be connected to symmetrical taps on coil 78 of oscillating circuit 64 to adjust deflection plate R.F. potentials.

FIG. 6 shows the application of the invention to a three color television system.

In this case there are two sheet beam tubes schematically indicated at 78, 79 with output lines 80 and 81, respectively, each being adapted to carry each one modulated chrominance information signal, while a third output line 82 is derived from two output lines 83, 84 interconnected and adapted to carry a third chrominance information signal. Input lines 85, 86 also are interconnected and adapted to receive the intensity information signal at 87.

Feedback lines 88, 89 and 90 extend over appropriate coupling devices or capacities 91, 92, and 93 to deflection means or electrodes (not shown) whereby one of the deflection electrodes in each of devices 77, 78 are interconnected over line 94. In this case the switching of the three chrominance information signals by means of feedback lines 88, 89 and 90 is made substantially independent from the color translation function in accordance with this invention.

Figure 7:
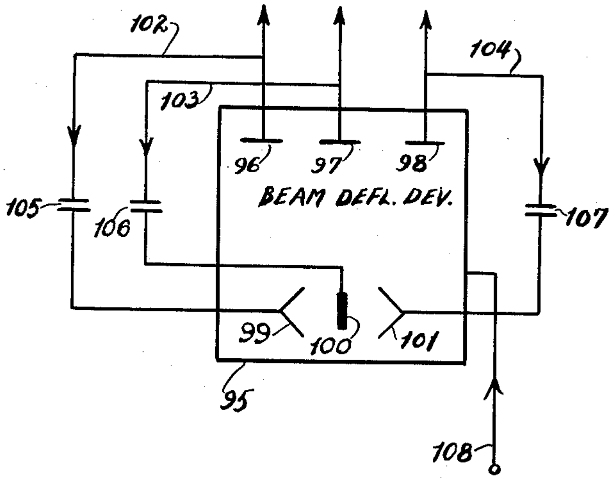

In the modification of FIG. 7 a single sheet beam tube or beam deflection device is schematically indicated at 95, having three output electrodes 96, 97 and 98 arranged as the corners of an equi-lateral triangle, at the top or face of the tube and associated with an electron beam which is controlled by three similarly triangularly arranged deflecting electrodes schematically shown at 99, 100 and 101.

Output electrodes 96, 97 and 98 are arranged and connected to receive the different chrominance information signals of a three color reproduction system. Feedback lines 102, 103 and 104 extend from output electrodes 96, 97 and 98 over capacity couplings 105, 106 and 107 to deflecting electrodes 99, 100 and 101 in a manner similar to that indicated above in connection with FIGS. 1 to 6 to assure independence of the switching function from the oscillating or translating function.

Intensity information is applied to tube or device 95 or a common control electrode thereof (not shown) over line 108.

In FIG. 8 part 109 is a sheet beam tube of the type mentioned in any of the preceding figures of the drawings, to the deflecting electrodes of which there are applied over lines 110, 111 the locally derived color components F1, F2. Chroma input is applied over line 112 to a control electrode of tube 109.

This chroma input includes the so-called burst of reference, i.e., the 8 cycles of reference frequency provided on the back porch of the synchronizing signal as shown for example in FIG. 8 at 113.

This reference burst in turn will appear on the anodes of tube 109 with opposite polarity but with different amplitudes schematically indicated in FIG. 8 at 114, 115 with a phase difference depending upon the synchronism of the two phase signals or depending upon the frequency deviation of the local oscillator of which only the frequency controlling reactance tube or stage 116 is shown in FIG. 8.

The difference voltage derived from output resistor network 117 of tube 109 is used to control the grid of a gating tube or pentode 118, the anode of which is controlled by a train of gating pulses derived from the synchronizing signals received from the transmitter in otherwise well known manner, as schematically indicated in FIG. 8 at 119.

Any deviation from synchronism will result in a varying amplitude of an error or compensation voltage derived at terminal 120 of an output network 121 which also serves as a filter and integrator for gate pulses 119.

This error voltage is applied in otherwise well known manner to control over reactor 2 reactance tube 116 the local oscillator of the television receiver.

The error voltage measures or indicates the difference in phase of the local oscillator and burst.

Thus during the screen portions of the television signal, once during each line the signal information as to frequency and phase of the master oscillator of the transmitter is used to control the frequency of the local oscillator by applying the difference signals derived from the color components to the grid of a gating tube together with gating pulses being applied to its anode, the latter being derived from the horizontal synchronizing signal preceding the reference burst and slightly predeterminedly delayed with respect thereto if necessary, so as to cause it to coincide with the burst.

Depending upon the amplitude of the gate output voltage changes in error voltage are produced which are then applied to the frequency control device or reactance tube of the local oscillator.

Preferably if the two bursts derived at point 122 from the anode of sheet beam tube 109 are opposite and equal, then no effective control voltage or at least a voltage not exceeding a predetermined zero voltage will result at terminal 120 of output network 121.

The invention is of course not limited to the circuits and circuit elements shown or described or to the particular electronic tubes or discharge devices mentioned but may be applied in any form or manner whatsoever without departing from the scope of this disclosure.

I claim:

1. In an electronic oscillator for producing separate color components from a multi component color television signal, means for producing an electronic beam, a control electrode arranged in the path of said electron beam, means for applying to said control electrode a modulating input including said multi component color television signal, a number of electron receiving electrodes corresponding to the number of color components, a number of further electrodes arranged to cooperate with corresponding receiving electrodes facing said receiving electrodes for deflecting said electron beam to said receiving electrodes, and separate feedback circuits, each feedback circuit including a capacity coupling connecting each of said receiving electrodes to a deflecting electrode arranged facing the other receiving electrode, for producing different deflections in the rhythm of said different color components; said receiving electrodes being only intercoupled by means of an oscillator circuit so as to derive substantially independent color component outputs from inter-connections from receiving and deflecting electrodes arranged obliquely with respect to each other.

2. Oscillator according to claim 1, comprising a crystal device connecting said deflecting electrodes, and a trap in each of said output circuits to eliminate the crystal frequency.

References Cited in the file of this patent

UNITED STATES PATENTS

| | | |
|---|---|---|
| 1,986,632 | Hansell | Jan. 1, 1935 |
| 2,042,321 | Lindenblad | May 26, 1936 |
| 2,195,455 | Hollmann | Apr. 2, 1940 |
| 2,247,234 | Hansell | June 24, 1941 |
| 2,597,571 | Cuccia | May 20, 1952 |